Feb. 18, 1958   J. R. ANDERSON ET AL   2,823,944
MOVABLE LOAD SUPPORTING DEVICE

Filed Aug. 18, 1955   3 Sheets-Sheet 1

INVENTORS
John R. Anderson &
Daniel L. Janoff

Hoopes Leonard & Buell
Their attorneys

Feb. 18, 1958 J. R. ANDERSON ET AL 2,823,944
MOVABLE LOAD SUPPORTING DEVICE
Filed Aug. 18, 1955 3 Sheets-Sheet 2
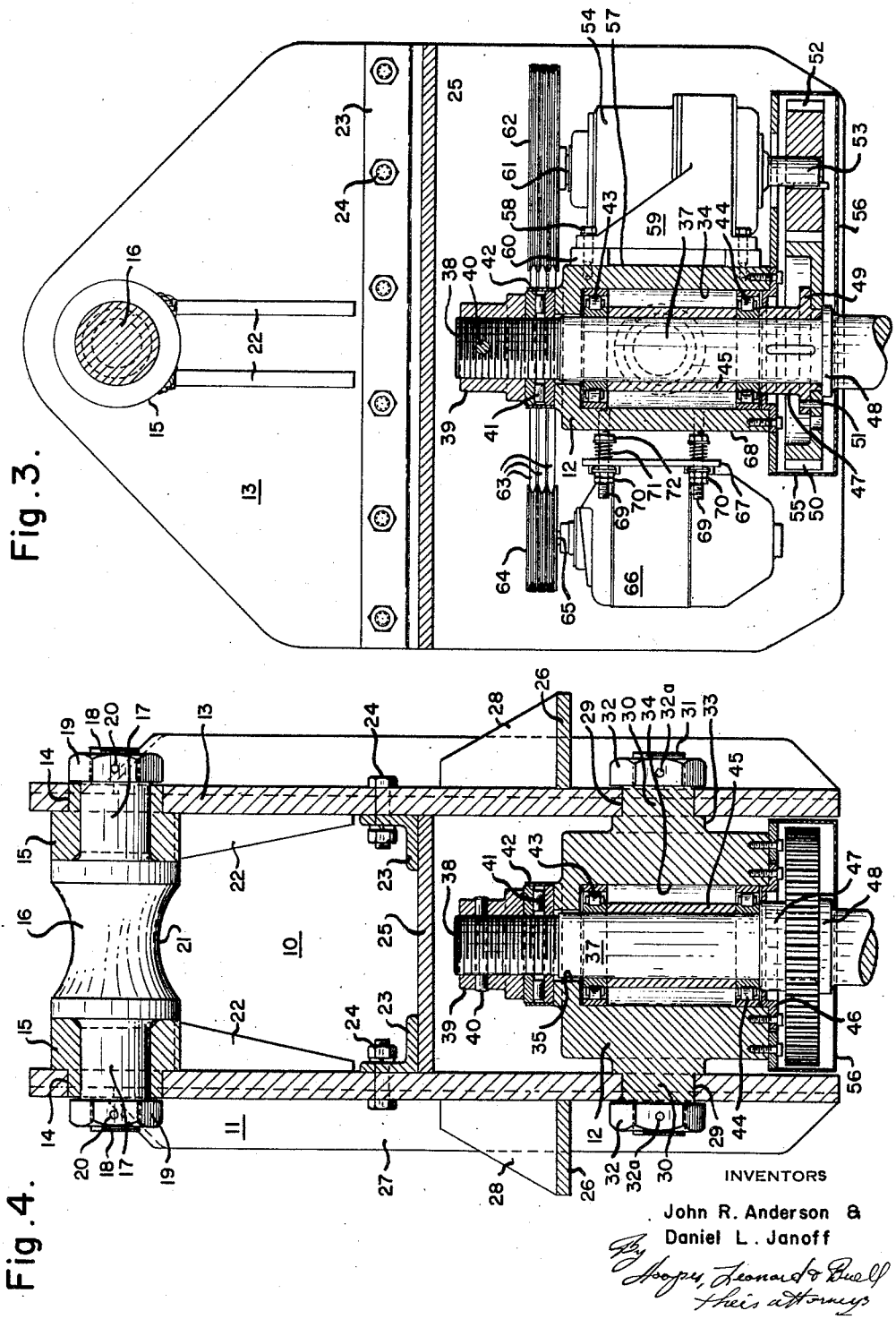
INVENTORS
John R. Anderson &
Daniel L. Janoff Feb. 18, 1958  J. R. ANDERSON ET AL  2,823,944
MOVABLE LOAD SUPPORTING DEVICE
Filed Aug. 18, 1955  3 Sheets-Sheet 3
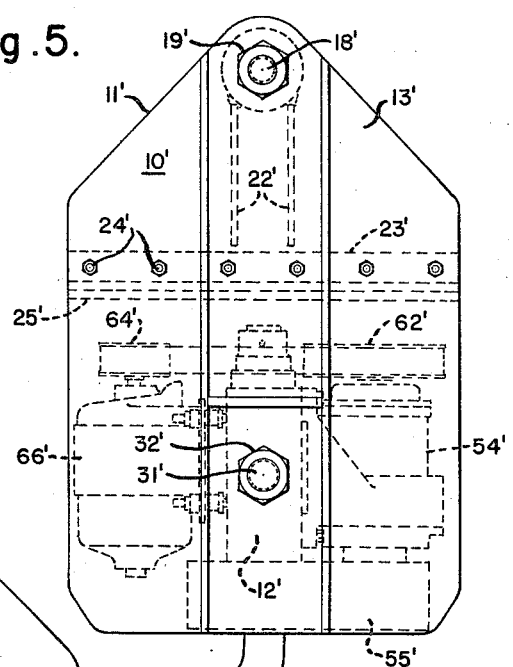
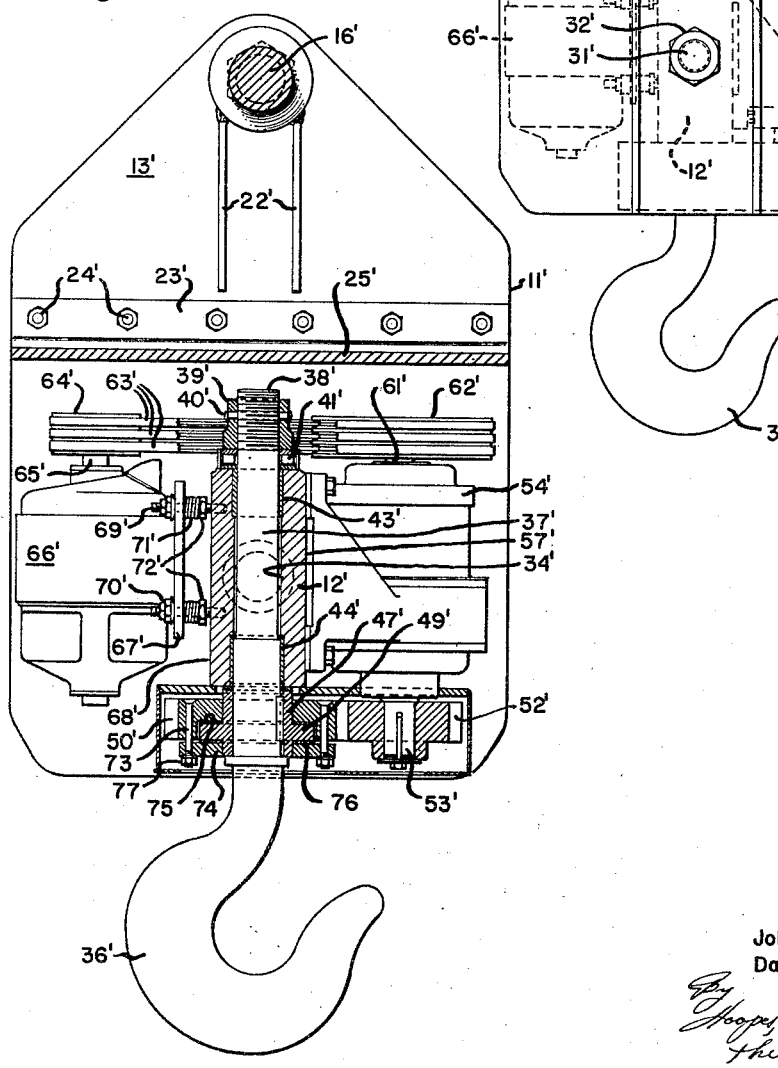
INVENTORS
John R. Anderson &
Daniel L. Janoff

United States Patent Office 2,823,944
Patented Feb. 18, 1958

2,823,944

MOVABLE LOAD SUPPORTING DEVICE

John R. Anderson, Pittsburgh, and Daniel L. Janoff, Mount Lebanon Township, Allegheny County, Pa., assignors to Heppenstall Company, Pittsburgh, Pa., a corporation of Pennsylvania Application August 18, 1955, Serial No. 529,194

7 Claims. (Cl. 294—82)

This invention relates to a load supporting device capable of being moved. More particularly, it pertains to a motorized swivel hook device which may be hung in relatively stable and balanced condition from a crane or boom or other materials-handling equipment.

In a number of prior devices having hooks on which loads are carried, whether such devices were in the nature of primary units such as hook blocks through which lines were reeved, or were an auxiliary device supported from a primary unit so that the auxiliary device might itself directly support a load, the problems of complexity, of canting and of lack of stability have been present. Where the loads to be encountered are of a material magnitude, lack of balance may sometimes become a hazard to personnel and to property. In other such devices, it has not been possible to make, or no provision has been made, for adjustment of balance. In other situations, the assembly or disassembly of such devices has not been readily performable, or has involved special shapes, with attendant increased cost and expense.

In this invention, the deficiencies of the prior art have been overcome. Devices made in accordance with our invention, for example, are relatively balanced about a vertical axis and the new construction is such as to decrease the headroom required in many cases and also to provide a readily assemblable and disassemblable unit. Other objects and advantages of this invention will be apparent from the following description and from the accompanying drawings, which are illustrative only, in which—

Figure 3 is a view in section of such embodiment taken along line III—III of Figure 1;

Figure 4 is a view of such embodiment taken along line IV—IV of Figure 2;

Figure 5 is a view in side elevation of a modified embodiment of our invention; and Figure 6 is a view of such modified embodiment having that sectional relation to Figure 5 that Figure 3 bears to Figure 1.

Figure 2:
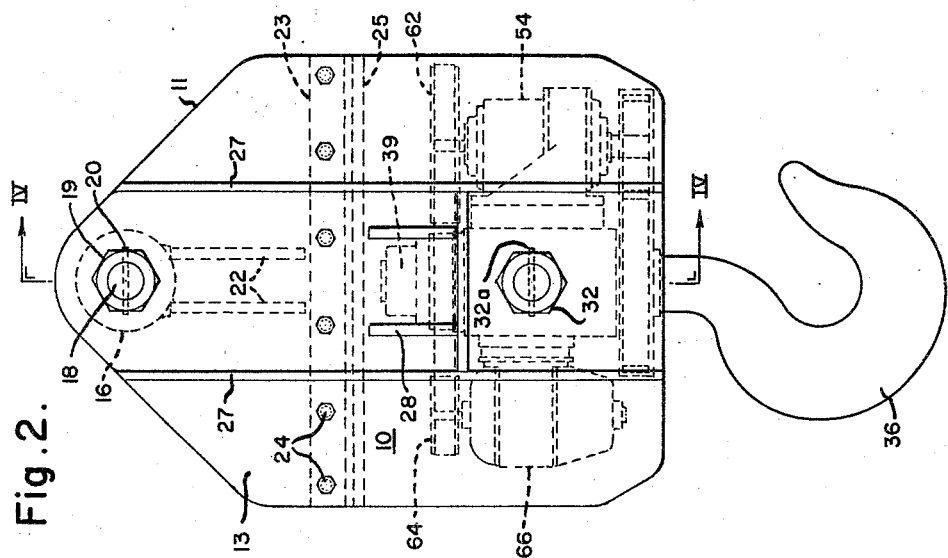
Figure 2 is a side view of the embodiment shown in Figure 1.
Figure 1:
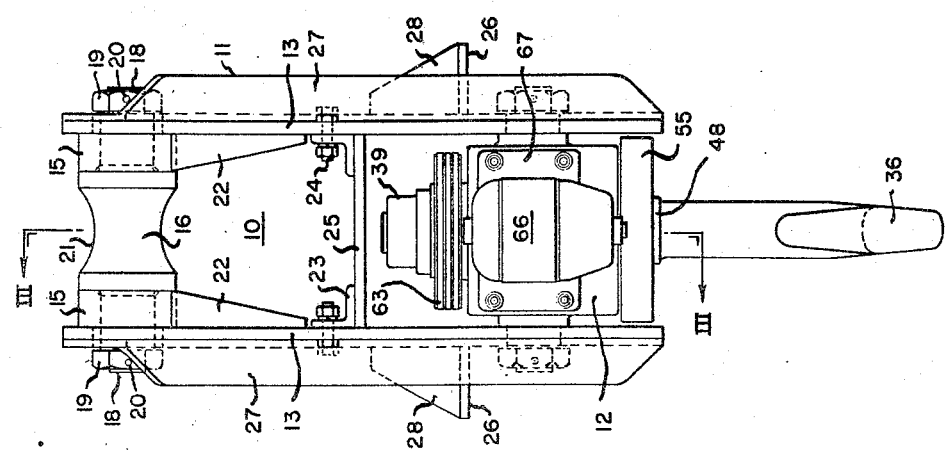
Figure 1 is a front view of one embodiment of our invention adapted to be hung from the hook of a crane or a boom or other materials-handling equipment.

Figures 1 to 4 of the drawings show one embodiment in the form of an auxiliary motorized swivel hook device 10 made in accordance with our invention. Device 10 includes a frame 11 and a subframe 12, all of the parts of which are readily assemblable and disassemblable. Frame 11 in turn may comprise a pair of vertical spaced side plates 13 of sufficient strength and/or capacity, as are the other parts of our devices, for the intended service to be performed thereby. Registering openings 14 may extend through the side plates 13 adjacent the top thereof and be provided with spacer collars 15 welded to plates 13. A clevis pin 16, which may be rotatable, is provided with laterally extending arbors 17 which pass through the central openings in the spacer collars 15.

The outer ends 18 of arbors 17 are reduced in diameter and threaded for the receipt of connecting nuts 19 which are locked in place by locking pins 20 extending through registering holes in the ends 18 and the nuts 19. Reduced diameter center 21 on pin 16 serves to accommodate a hook of a crane or a sling or other member from which the device 10 may be suspended in the normal course of its usage. Side plates 13 and spacer collars 15 may have brackets 22 welded thereto for strengthening purposes.

Angles 23 may be fastened to the insides of each of the plates 13 by lock nut and bolt units 24, the angles 23 being in opposed relation and having a horizontal connector 25 welded to the underside of each of the horizontal flanges of the respective angles 23, thereby further serving to correctly space the side plates 13 and to strengthen the frame 11 of which the members 23 and 25 are a part. The outer sides of the plates 13 at the same height may be provided with flat stands 26 extending between vertical ribs 27 to which the stands 26 are also joined as by welding. Strengthening plates 28 may also be provided between each stand 26 and the outer side of the respective plate 13 so that the unit 10, if desired, can be set down and supported by the stands 26 whenever it is desired to inspect or to work upon device 10 at a convenient level for a workman.

A further pair of registering openings 29 extend through the side plates 13 adjacent the bottom thereof for the receipt of side arms 30, the outer ends 31 of which are reduced in diameter and threaded for receipt of the locking nuts 32 suitably secured to the arms 30 as by lock pins 32a. Arms 30 are provided with bases 33, the outer faces of which may be used to fit in the appropriate spacing between the side plates 13 as shown in Figure 4. Thereby, the subframe 12 is free to move slightly so that the center of gravity of the parts supported by subframe 12 preferably is in a vertical plane through the axis of the side arms 30.

Subframe 12, in the illustrated embodiment being described, is provided with a vertical bore 34 extending upwardly from the bottom thereof and having a portion 35 of reduced diameter extending through the top of the subframe 12. A load supporting member which may be in the form of a swivel hook 36 is provided with a vertical shank 37 having its upper end 38 extending through opening 35 and threaded for engagement by a cap nut 39 which may be locked in place by a lock pin 40 extending through the cap nut 39 and shank end 38. A roller thrust bearing 41 between the bottom face of nut 39 and the top of subframe 12 may be used to support swivel hook 36 and such loads as it may carry from time to time. A circular guard 42 may be provided as a part of bearing 41 to surround its outside keeping dirt out of the bearing and holding lubricant in. Roller bearings 43 and 44 in bore 34 may be provided around shank 37 and spaced by a tube 45 to provide aligned journal bearings for the hook 36 and shank 37 which are subjected, in sizable installations, to forces of great magnitude. A retainer plate 46 may be bolted to the underside of frame 12 to close the lower end of bore 34 and to provide such seal as may be desired in the event that the interior of bore 34 is to be filled with oil, a similar seal being provided, if desired, adjacent the location of bearing 41.

Shank 37 may be keyed to a thrust collar 47 extending between flange 48 at the bottom of the shank and the underside of bearing 44. Thrust collar 47 keeps the roller bearings 43 and 44 in position. An annular flange 49 on collar 47 overlies the hub of a driven gear 50, a shear pin 51 being in engagement respectively with collar 47 and gear 50. Driven gear 50 is in mesh with a drive gear 52 keyed to an output shaft 53 of a gear or other positive speed reducer 54. A gear case 55 surrounds gears 50 and 52 and may fit between side plates 13 and be bolted to the underside of subframe 12. The bottom 56 of gear case 55 may be removably attached thereto. Thereby, the side plates 13 protect the gearing and help with the housing 55 to keep persons from coming in accidental contact with such gearing. As output shaft 53 rotates, it is evident that it will swivel hook 36 correspondingly to whatever extent is desired for orientation of the load being carried by hook 36, whereby such a load may be picked up or deposited while facing in any direction that is selected.

Speed reducer 54 is bolted to the flat back side 57 of subframe 12 by bolts 58 passing through mounting holes in the base 59 of speed reducer 54. The bolts 58 engage threads in registering holes in mounting bars or blocks 60 which may be welded to back 57. The input shaft 61 of speed reducer 54 is keyed to a pulley 62 which may be a V-belt sheave. It will be noted that the width of the parts supported by subframe 12 where they intersect the plane of pulley 62 is less than the diameter of pulley 62. Hence, an endless driving belt 63 extending around pulley 62 and a drive pulley 64 will have the reaches thereof on each side of shank 37 out of contact with the inside of the side plates 13 and any other part of the device 10 except the pulleys themselves.

Drive pulley 64 is secured to a motor shaft 65 driven by an electric or other motor 66 which may be reversible. Power may be conducted to the motor 66, if electric, in a variety of ways such as by electrical conductors (not illustrated) with suitable control means at any desired point, usually somewhat remote relative to the new device 10. Motor 66 may be supported on a base 67 and mounted in a cushioned manner on the front side 68 of subframe 12. In such mounting, threaded studs 69 may have one end fastened to subframe 12, the other ends of the studs 69 extending freely through openings in base 67, adjustable lock nuts 70 regulating the free length of the stud. Springs 71 on each of the studs 69 may be interposed between the underside of base 67 and adjustable stop nuts 72 thereby providing for such cushioned mounting as well as providing an adjustment by means of which desired tension can be maintained in belt 63.

It will be noted that relative symmetry and balance are provided by our invention by having the motor and speed reducer respectively mounted on the front and back faces of the subframe 12. Further, a transverse median plane through the axes of clevis pin 16 and subframe side arms 30 also preferably contains the axis of shank 37. Again, a longitudinal median plane through the axis of shank 37 parallel to the side plates 13 preferably bisects the distance between such side plates. Thus, our new device is relatively stable and well balanced. It will be understood that directional terms like "vertical," "horizontal," "front," "back," and others which may be used herein are relative terms rather than being absolutes.

In the modified embodiment of our invention illustrated in Figures 5 and 6, parts thereof corresponding generally in structural and functioning characteristics are respectively provided with the same reference numerals with the addition of a prime factor thereto. In such modification, oilite bronze plain bearings 43' and 44' may be provided in place of roller bearings in bore 34' through subframe 12'. Moreover, thrust collar flange 49' is in driven connection relative to gear 50' by virtue of a frictional connection. Thus, bolts 73 having countersunk heads may engage the gear 50'. The lower threaded ends of those bolts pass through registering holes in an annular friction plate 74. Thereby, the upper and lower faces of flange 49' are sandwiched between gear 50' and plate 74 as shown in Figure 6, annular friction discs 75 and 76, usually of a friction material, being interposed respectively between flange 49' and gear 50' on the one hand and between flange 49' and plate 74 on the other hand. Hence, by tightening nuts 77 to a selected extent, which nuts 77 are locked in place in the selected setting by lock washers or other means, a predetermined amount of frictional force is provided between gear 50' and plate 74 on the one hand and the thrust collar 47' on the other hand. Consequently, so long as the force exerted through drive gear 52' does not exceed the frictional force in question, movement of drive gear 52' will rotate hook 36' about the vertical axis of shank 37'. However, when the effort to turn hook 36' through gears 52' and 50' encounters a resisting force exceeding the frictional force exerted upon flange 49', the gears will be able to turn with gear 50' and plate 74 frictionally slipping relative to flange 49' without damage to parts of the new device.

Various modifications may be made in features of the illustrated embodiments without departing from the spirit of our invention or the scope of the appended claims.

We claim:

1. In a motorized swivel hook device, in combination, a frame having spaced generally parallel side plates, a clevis pin engaging said side plates and extending between them to support said frame, a subframe between said side plates having side arms normal to and engaging said side plates to support said subframe, said subframe having a vertical bore, a depending load supporting hook journaled in said subframe, said hook having a shank extending upwardly through said bore, antifriction bearing means to prevent axial movement of said hook relative to said subframe, said hook being rotatable in said subframe about the axis of said shank, a positive speed reducer mounted on one face of said subframe generally midway between said side plates, said speed reducer having an output shaft extending vertically downwardly below said speed reducer, a horizontal drive gear affixed to said output shaft adjacent the bottom of said shank, a horizontal driven pulley connected to the vertical input shaft of said speed reducer above said speed reducer, a horizontal driven gear having a hub connected to said shank, said driven gear being intermeshed with said drive gear, a motor mounted on the opposite face of said subframe generally midway between said side plates, said motor having an armature shaft extending vertically above said motor, a horizontal drive pulley connected to said armature shaft, said pulleys being in the same plane, and a belt connecting said pulleys, the distance between the reaches of said belt being sufficiently far apart to span parts of said subframe intersecting the plane of said pulleys.

2. In a motorized swivel hook device, in combination, a frame having spaced side plates, means extending between said side plates to support said frame, a subframe having side arms extending between and engaging said side plates to support said subframe, a depending load supporting hook centrally and rotatably supported by said subframe, a speed reducer mounted on one side of said subframe between said side plates, a drive gear connected to said speed reducer, a driven pulley connected to said speed reducer, a driven gear connected to said drive gear to rotate said hook, a motor mounted on the other side of said subframe between said side plates, a drive pulley connected to said motor, said pulleys being in the same plane, and means connecting said pulleys.

3. In a motorized swivel hook device, in combination, a frame having side members, means for carrying said frame, a subframe centrally mounted on said frame between said side members, said subframe having a vertical bore, a depending load supporting hook having a shank extending upwardly through said bore of said subframe, subframe bearing means to prevent axial movement of said hook relative to said subframe, said hook being rotatable in said bearing means about the axis of said shank, a speed reducer mounted on one side of said subframe, a motor mounted on the other side of said subframe, said speed reducer and said motor being between said side members, endless drive means between said side members and extending between said motor and said speed reducer to drive said speed reducer when said motor is actuated, and gear means at the opposite end of said speed reducer interconnecting said speed reducer and said hook to rotate said hook when said motor is actuated, said gear means also being between said side members.

4. In a movable load supporting device, in combination, spaced generally parallel side plates, a clevis adjacent the top of said side plates from which said device may be suspended, a journaling subframe extending between said side plates adjacent the lower portion thereof and substantially balanced about both vertical median planes, said subframe having front and back faces, a motor resiliently mounted on one of said faces, a speed reducer mounted on the other of said faces, endless drive means extending between said motor and said speed reducer within the space between said side plates, said endless drive means clearing said subframe and side plates, a hook having a vertical shank rotatably supported in said subframe, said hook depending below said side plates, said shank being axially immovable in said subframe, the axis of said shank lying generally at the intersection of said median planes, gear means between said speed reducer and said hook to rotate said hook in response to actuation of said motor, and means to limit the force transmittable relatively between said gear means and said hook.

5. In a movable load supporting device, in combination, spaced side plates, means adjacent the top of said side plates from which said device may be suspended, a journaling subframe extending between said side plates adjacent the lower portion thereof and substantially balanced about a transverse median plane, said subframe having front and back sides, a motor mounted on one of said sides, a speed reducer mounted on the other of said sides, drive means extending between said motor and said speed reducer within the space between said side plates, said drive means clearing said subframe and side plates, a load supporting member having a vertical shank rotatably supported in said subframe, the axis of said shank lying generally in said transverse median plane, and gear means between said speed reducer and said member to rotate the same in response to actuation of said motor.

6. In a movable load supporting device, in combination, spaced generally parallel frame members, a member adjacent the top of said frame members from which said device may be suspended, a hook having a shank rotatably but not axially movable and mounted between said frame members in a central position, said hook extending below said frame members, a motor drive mounted between said frame members on one side of said shank, reduction means mounted between said frame members on the other side of said shank, driving means between said reduction means and said hook to rotate said hook in response to energization of said motor drive, means to limit the force which said driving means may exert upon said hook when said motor drive is energized, and mounting means for said last-mentioned means.

7. In a movable load supporting device, in combination, spaced frame members, means on said frame members by which said device may be suspended, a load supporting member having a shank mounted between said frame members and rotatably but not axially movable, said last-named member extending below said frame members, a motor drive mounted between said frame members on one side of said shank, intermediate means mounted between said frame members on the other side of said shank, and driving means connected to and between said intermediate means and said load supporting member to rotate the latter in response to actuation of said motor drive.

References Cited in the file of this patent

UNITED STATES PATENTS

| | | |
|---|---|---|
| 1,577,283 | Mitchell | Mar. 16, 1926 |
| 1,818,584 | Schroeder | Aug. 11, 1931 |
| 2,488,107 | Abegg | Nov. 15, 1949 |
| 2,524,189 | Clay | Oct. 3, 1950 |